Patented Aug. 12, 1930

1,772,516

UNITED STATES PATENT OFFICE

FRANK WILLIAM LINCH AND ERNEST HARRY RODD, OF BLACKLEY, MANCHESTER, ENGLAND, ASSIGNORS TO BRITISH DYESTUFFS CORPORATION LIMITED, OF MANCHESTER, ENGLAND

PROCESS FOR PREPARING TRIARYLMETHANE DYES

No Drawing. Application filed October 25, 1928, Serial No. 315,100, and in Great Britain November 17, 1927.

The specification accompanying application Serial No. 155,098 describes the preparation of carbinols of the triarylmethane series by condensing sodium derivatives of tetra-alkyldiaminobenzophenones with aromatic chloro compounds. In our preferred process, as described in the examples, we used toluene as solvent, working at a temperature of 85–100° C. It was subsequently discovered that under these conditions by-products are formed, especially diarylbenzyl-carbinols, produced through the interaction of the sodium derivative of the ketone with toluene (see the specification of British Letters Patent No. 289,571). By further experiments we have discovered that the condensation of the chloro compound with the ketyl compound proceeds equally as well at a lower temperature, e. g. 60° C., as at the higher temperature previously used, although at the lower temperature the sodium is in the solid form, not fluid as at the higher temperature. Working at 60° C. we prefer to use benzene as solvent since it is cheaper and at the same time gives rise to a lesser quantity of by-products. Under our new conditions we therefore obtain a higher yield and a purer product. The following example illustrates the improved method of working. The parts are by weight.

Example.—A mixture of 26.8 parts of Michler's ketone, 17.0 parts of 4-chloro-m-xylene, 100 parts of benzene and 4.6 parts of sodium, in the form of granules, wire or small pieces, is heated in a closed vessel with vigorous stirring at 60° C. for 10–12 hours. If any small particles of sodium remain they can be removed by filtration or by careful addition of alcohol.

The benzene is removed by steam distillation and the residue of carbinol is dissolved in a hot solution of 19 parts of oxalic acid in 500 parts of water. The solution of the oxalate of the dye is filtered from a little unchanged ketone, concentrated to half its bulk and allowed to crystallize. The dyestuff oxalate crystallizes in bronzy nodules, the weight obtained, dried at 40° C. being about 35 parts.

The same method of procedure can be applied to the condensation of chlorobenzene, chlorotoluene, chloroxylenes, chloroanisoles, chloronaphthalenes and the like with the sodium derivatives of tetramethyl- or tetraethyldiaminobenzophenones.

What we claim and desire to secure by Letters Patent is:—

A process for the manufacture of triarylcarbinols, which in the form of their salts are basic dyestuffs, consisting in reacting a tetraalkyldiaminodiaryl ketone with an alkali metal and with an aryl halide in presence of benzene as solvent and at a temperature not exceeding about 60° C.

In testimony whereof we affix our signatures.

FRANK WILLIAM LINCH.
ERNEST HARRY RODD.